Figure 1:
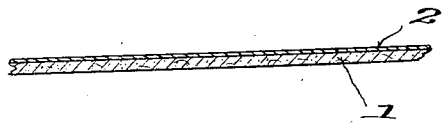

May 3, 1932.  J. T. BALDWIN  1,856,369
FLOOR COVERING
Filed Oct. 1, 1926

Julian T. Baldwin, Inventor
By Prentiss, Stone & Boyden.
Attorney

Patented May 3, 1932

1,856,369

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

FLOOR COVERING

Application filed October 1, 1926. Serial No. 138,897.

This invention relates to an improvement in smooth-surfaced floor coverings and to coatings therefor.

The chief object of this invention is to provide means for renewing old and worn linoleum or felt base floor coverings by attaching a new decorative or wear layer to the old base. Ordinarily when a decorative coat is worn off, the base is generally in good condition but must be thrown away because of its unsightly appearance. The placing of a new decorative or wear coat upon the old base would prevent this waste and would result in economy, especially in the case of linoleum bases, where the cost of the decorative layer would be about one-eighth of the cost of the original linoleum. In the case of felt bases, the cost of the decorative layer would be about one-quarter to two-thirds of the cost of the original goods.

The present invention provides a floor covering consisting of a thin fibrous sheet material coated with an upper wear layer of a composition possessing certain desirable properties such as flexibility, toughness, durability, smoothness, and a high resistance to the alkalies and soaps used for cleaning purposes.

The thin sheet material which may be kraft paper, or other suitable paper, or cloth, is made waterproof by impregnating the same with tung oil or pyroxylin. An initial coating of an inexpensive solid color paint is preferably applied to the waterproofed sheet to prevent saturation by the coating composition of this invention, which latter serves as the decorative or wear coat. The coated sheet may be attached to a linoleum or felt base by any suitable means. For instance, it may be cemented on by means of a composition of the nature set forth below.

The coating composition applied to the sheet material consists of resinous substances, natural or synthetic, plasticizers and optionally modifiers. Pigments or dyes of various kinds may be added to produce colored compositions to be used for decorative purposes, or they may be omitted, in which case the composition may be applied to a decorative layer and serves as a transparent wear coat.

Examples of resinous substances employed are: acaroides gum, rosin, Manila copal, shellac, cumar, ester gum and the like. It is to be understood that by resin is meant a true resin as technically distinguished from a gum. A true resin, for instance, is insoluble in water, whereas a gum is soluble in water.

Ester gum is the product resulting from the esterification of an acid resin such as rosin with an alcohol such as glycerol. The reaction is generally carried on by heating the two materials to 280° C.

Plasticizers are substances or mixtures of substances which apparently form a permament gel or state of solution with resins. When a plasticizer is mixed with resinous substances such as the above, the resulting composition is generally considered to be a solution of the resinous substance in the plasticizer, the plasticizer being the external phase. It is desirable in the present case to have the plasticizer as the internal phase or in solution in the resinous substance. The solution is probably not a true solution but a gel, or a dispersion of plasticizer in the resin, and it will be observed that one characteristic of this dispersion is that the amount of resin by weight far exceeds the amount of the plasticizer.

Plasticizers are generally liquid and have practically no vapor pressure at ordinary temperatures (70° F.). They are sometimes spoken of as high boiling point solvents for gums and resins, their boiling points ranging not much below 300° C.; they are chemically stable; free from tackiness; and impart to the resins the important properties of flexibility, toughness, impermeability, durability, and smoothness of surface. Examples of plasticizers are: diethyl phthalate, dibutyl phthalate, diamyl phthalate, dibutyl tartrate, triphenyl phosphate, and tricresyl phosphate.

Modifiers are substances which impart such desirable properties as hardness, elasticity, and resistance to wear. They also serve as cheapness and are used only optionally. Examples of modifiers are: waxes (such as Montan wax), rubber, fatty acids of vegetable oils, polymerized oils, drying oils such as tung oil, and hydrocarbons such as spinacene and squalene.

The use of volatile solvents is optional, depending upon the manner of applying the coats. Examples of solvents are: ethyl alcohol preferably denatured, benzol, toluol, naphtha, and the like.

The following is a general formula for a decorative wear coat:

|  | Parts by weight |
|---|---|
| Resinous substances | 100 |
| Plasticizer | 35 |
| Modifier | 5-115 |
| Pigment | 100-200 |
| Solvent (if used) | 100 |

When a solvent is used, the composition may be applied by means of the regular flatbed or rotary printing machines or by handblocks in the same way that oil paints are usually applied. A solvent recovery system may be used to recover the solvents. The use of a solvent may be done away with by softening the composition by heat and using the above mentioned machines with heated metal printing blocks, heated rollers, heated paint carriages and troughs.

Examples of specific formulas used for decorative wear coats are as follows:

|  | Parts by weight |
|---|---|
| Ester gum | 100 |
| Dibutyl phthalate | 20 |
| Heavy bodied linseed oil | 15 |
| Pigments and fillers | 135 |

The above mixture is applied with heat as the flow producing agent. When used with solvent the following may be added:

|  | Parts by weight |
|---|---|
| Xylol | 50 |
| Solvent naphtha | 50 |

The amount of solvent used depends on the consistency desired. Altering the quantity of pigment and filler, changes the consistency, but also changes the properties of the coating.

The decorative layer, examples of which have been given, may be coated with a transparent wear coat such as a cellulose ester composition or other transparent varnishes and lacquers and no claim is made to coatings of such known materials, or a resin-plasticizer composition of the nature to be set forth. On the other hand, a transparent wear coat comprising a resin and a plasticizer may be applied to a fibrous sheet material with or without a decorative coat whether the decorative coat be an oil paint or a resin plasticizer composition.

A general formula for a transparent wear coat is as follows:—

|  | Parts by weight |
|---|---|
| Resinous substances | 100 |
| Plasticizer | 30 |
| Modifier | 5 |
| Solvent (if used) | 200 |

This composition may be applied without the use of a solvent by softening by means of heat and by using in this case hot transfer rollers, or hot squeeze rollers. The liquid may be applied by means of transfer rollers, squeeze rollers, a spray, a brush or any other suitable means.

Two satisfactory formulas for transparent coatings are:

1

|  | Parts by weight |
|---|---|
| Bleached shellac | 100 |
| Dibutyl tartrate | 35 |
| 188 proof denatured ethyl alcohol | 100 |

The alcohol may be omitted and heat used to produce the necessary flow.

2

|  | Parts by weight |
|---|---|
| Cumar, light varnish grade | 50 |
| Ester gum | 50 |
| Diethyl phthalate | 25 |
| Rubber | 5 |
| Benzol | 100 |

The fibrous sheet to which the above coatings are applied, is dried at a relatively high temperature, above 145° F., if desired. Since no saturants are used which melt and discolor the decorative coat or render it tacky and slow drying as in the case of bitumen saturated felt, a higher temperature may be safely used. Owing to the thinness of the sheet and the higher temperature, the drying time is very much less than in the case of coated felt or linoleum bases. Air penetrates through the thin fibrous sheet, especially at high temperatures, and if it is not highly saturated, oxidation of the decorative layer may occur not only on the top surface, but also from underneath, resulting in a product that is more resistant to wear than the product which is oxidized on the top surface only.

Figure 2:
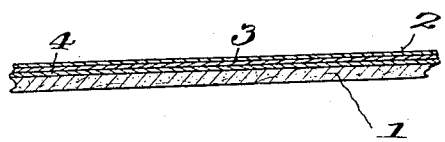

In the accompanying drawings, Fig. 1 diagrammatically shows a thin sheet of paper 1 with a transparent wear coat 2; Fig. 2 shows a thin sheet of paper 1 with a decorative coat 3 and a transparent wear coat 2. A solid color coating paint which may be applied to the paper, is shown at 4. The views are enlarged cross sections. Satisfactory results have been obtained with a floor covering having a thickness of, including the fibrous sheet with its coatings, between 0.015 and 0.020 of an inch, or in other words, the entire thickness is approximately twice the thickness of the coatings 2, 3 and 4.

The supporting paper is of just enough thickness and toughness to hold the layers of coating materials together while in the course of handling from the manufacturer to the household. The combined paper and coatings have just sufficient stiffness to enable the product to be rolled and handled without crumpling.

The resin plasticizer material described in this invention as the coating of a supporting sheet carrying the same is also described and claimed as the saturant of an impregnated sheet in my copending application Serial 159,917, filed Jan. 8, 1927.

I claim:

1. A floor covering consisting of a thin fibrous sheet, and a coating on said sheet, comprising ester gum, dibutyl phthalate, and linseed oil, and pigments.

2. A floor covering consisting of a thin fibrous sheet, and a coating on said sheet, comprising ester gum, dibutyl phthalate, linseed oil, and pigments.

3. A floor covering consisting of a thin fibrous sheet, and a coating on said sheet, comprising a resin 100 parts by weight, a plasticizer 35 parts by weight, and a modifier 5–15 parts by weight.

4. A floor covering consisting of a thin fibrous sheet, and a coating on said sheet, comprising a resin 100 parts by weight, a plasticizer 35 parts by weight, a modifier 5–15 parts by weight, and pigments 100–200 parts by weight.

5. A floor covering consisting of a thin fibrous sheet, a decorative coat of paint on said sheet, and a transparent coating over said decorative coating, the said transparent coating comprising ester gum and dibutyl phthalate.

6. A floor covering consisting of a thin fibrous sheet, a decorative coat of paint on said sheet, and a transparent coating over said decorative coating, the said decorative coating comprising ester gum, dibutyl phthalate, and pigments.

7. In a floor covering, a supporting sheet carrying a coating free from tackiness having as its two major ingredients a resin and a a substantially chemically stable plasticizer for the resin.

8. In a floor covering, a supporting sheet carrying a coating of a composition gel free from tackiness having as its two major ingredients a resin and a dispersion of a substantially chemically stable plasticizer in the resin.

9. In a floor covering, a supporting sheet carrying a coating free from tackiness having as its two major ingredients a resin and a substantially chemically stable plasticizer for the resin, the proportions of materials being at least two parts of resin to one part of plasticizer at the time of mixing.

10. In a floor covering, a supporting sheet carrying a coating free from tackiness having as its two major ingredients a resin and a substantially chemically stable plasticizer for the resin, the proportions of materials being not less than 20 parts of plasticizer nor more than 35 parts of plasticizer to each 100 parts of resin at the time of mixing.

11. In a floor covering, a supporting element carrying a coating free from tackiness and having a relatively large proportion of two major ingredients consisting of a resin and a substantially chemically stable plasticizer for the resin, and secondarily a relatively small proportion of minor ingredients, including modifiers.

12. In a floor covering a supporting sheet carrying a coating free from tackiness having as its two major ingredients resin and a substantially chemically stable plasticizer for the resin, and which plasticizer is selected from the following: diethyl phthalate, dibutyl phthalate, diamyl phthalate, dibutyl tartrate, triphenyl phosphate, and tricresyl phosphate.

In testimony whereof I affix my signature.

JULIAN T. BALDWIN.

CERTIFICATE OF CORRECTION.

Patent No. 1,856,369.  May 3, 1932.

JULIAN T. BALDWIN.

It is hereby certified that error appears in the printed specification of the above numbered patent requiring correction as follows: Page 2, line 7, for "cheapness" read cheapeners; page 3, line 23, claim 1, strike out the comma and words ", and pigments"; and that the said Letters Patent should be read with these corrections therein that the same may conform to the record of the case in the Patent Office.

Signed and sealed this 12th day of July, A. D. 1932.

M. J. Moore,
Acting Commissioner of Patents.

(Seal)